United States Patent
Cappelle et al.

(10) Patent No.: US 12,252,236 B2
(45) Date of Patent: Mar. 18, 2025

(54) SYSTEM FOR PILOTING AN AIRCRAFT, ASSOCIATED AIRCRAFT AND METHOD

(71) Applicant: DASSAULT AVIATION, Paris (FR)

(72) Inventors: Jérôme Cappelle, Saint Cloud (FR); François Pineau, Saint Cloud (FR); William Faysse, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 514 days.

(21) Appl. No.: 17/574,677

(22) Filed: Jan. 13, 2022

(65) Prior Publication Data
US 2022/0219809 A1 Jul. 14, 2022

(30) Foreign Application Priority Data
Jan. 13, 2021 (FR) .................................... 21 00288

(51) Int. Cl.
*B64C 13/50* (2006.01)
*B64D 31/04* (2006.01)
*B64D 31/06* (2024.01)

(52) U.S. Cl.
CPC ............ *B64C 13/503* (2013.01); *B64D 31/04* (2013.01); *B64D 31/06* (2013.01); *F05D 2270/021* (2013.01); *F05D 2270/101* (2013.01)

(58) Field of Classification Search
CPC ....... B64C 13/503; B64C 13/50; B64D 31/04; B64D 31/06; F05D 2270/021; F05D 2270/101
See application file for complete search history.

(56) References Cited

U.S. PATENT DOCUMENTS

| | | | |
|---|---|---|---|
| 6,345,603 B1 * | 2/2002 | Abboud | F02D 11/107 123/399 |
| 10,414,512 B2 | 9/2019 | Luszez | |
| 2009/0326745 A1 * | 12/2009 | Ramos | B64D 31/08 701/14 |
| 2016/0214730 A1 * | 7/2016 | Nouhaud | B64D 31/04 |
| 2018/0201386 A1 | 7/2018 | Strauss et al. | |
| 2020/0164965 A1 * | 5/2020 | Fervel | B64C 13/503 |
| 2021/0387741 A1 * | 12/2021 | Tamir | B64C 13/18 |

FOREIGN PATENT DOCUMENTS

WO   WO2020079675 A1   4/2020

OTHER PUBLICATIONS

Search Report for priority application FR 21 00288.

* cited by examiner

*Primary Examiner* — James J Lee
*Assistant Examiner* — Andrew Sang Kim
(74) *Attorney, Agent, or Firm* — Davidson Kappel LLC (57) ABSTRACT

A system for piloting an aircraft includes a throttle, a flight parameter sensor system, and an engine calculator controlling thrust parameters of an engine of the aircraft. The piloting system includes a flight control unit connected to the engine calculator, the sensors and the throttle. The flight control unit generates a thrust control vector from a flight control law and sends a digital signal including the generated thrust control vector to the engine calculator. The engine calculator controlling said thrust parameters of the engine depending on the generated thrust control vector received.

17 Claims, 2 Drawing Sheets

SYSTEM FOR PILOTING AN AIRCRAFT, ASSOCIATED AIRCRAFT AND METHOD

The present disclosure relates to an aircraft piloting system of the type comprising:
- a throttle lever, operable by an aircraft pilot, the throttle lever including at least one lever and a base body, the lever being movable angularly or translationally relative to the base body, the throttle lever being configured to emit a signal representative of the lever position relative to the base body;
- a system of sensors of aircraft flight parameters;
- an engine calculator capable of controlling thrust parameters of at least one engine of the aircraft by actuating engine control members.

BACKGROUND

In a traditional civil aircraft, it is known that the engine calculator directly receives the analog signal emitted by the joystick, and controls the engine thrust parameters depending on this signal. In other words, the engine calculator directly acquires the thrust command through the analog throttle lever position.

However, such a system does not give complete satisfaction. Indeed, this system involves significant analog acquisition noises, which are all the more important, the larger the distance between the throttle lever and the engine.

Moreover, the engine calculator is as close as possible to the engine that it controls. Thus, the analog signal acquisition stage of the engine calculator is in a difficult environment, in particular from the point of view of the engine temperature and vibrations generated. An analog signal acquisition in such an environment reduces engine control reliability.

A piloting system is also known in which the throttle lever is motorized, and thus comprises a engine to move the lever angularly relative to the base body. Such a system specifically comprises so-called "auto-throttle" algorithms that operate the throttle lever automatically by adjusting the lever position to vary the thrust control.

In the case where the lever is not motorized, the auto-throttle develops an offset that is acquired by the engine calculator and added to the acquired angular position.

However, the auto-throttle involves significant thrust control latency and delay. Also, in the event of throttle failure (such as loss of motorization, or other), the thrust control function by the auto-throttle is lost. Moreover, the total loss of throttle position implies an inability to pilot the engine in either manual or automatic mode.

SUMMARY

An object of the present disclosure is therefore to provide a piloting system for improving engine thrust control.

To this end, the present disclosure provides a piloting system as described above, comprising a flight control unit connected to the engine calculator, the sensors of the sensor system and the throttle, with the flight control unit configured to develop at least one thrust control vector from at least one flight control law, the flight control law having at least the signals received from the throttle and/or from the sensors of the sensor system as input data; the flight control unit being configured to send a digital signal comprising the generated thrust control vector to the engine calculator; and the engine calculator being configured to receive the digital signal and to control said engine thrust parameters according to the received depending on the generated thrust control vector.

The piloting system according to the present disclosure may include one or more of the following features, taken alone or in any technically feasible combination:
- the flight control unit comprises at least four redundant flight control computers, each flight control computer being connected to the throttle and to the sensor system, being configured to develop a thrust control vector, in parallel, from at least the said flight control law, and being configured to send a digital signal including the thrust control vector to the engine calculator;
- the engine calculator comprises at least two redundant engine controllers connected to each other, each engine controller being configured to make a selection from among the control vectors produced in parallel by each flight control computer, and to control said engine thrust parameters depending on the selected control vector;
- for each flight control computer, a digital data transfer link connects said flight control computer to a single one of the engine controllers, a first one of the engine controllers being connected, by at least one of the digital data transfer links, to two of the flight control computers and a second one of the engine controllers being connected, by at least one other of the digital data transfer links, to the two other of the flight control computers; the engine controllers being configured to communicate the respective received control vectors to each other;
- each digital signal includes a plurality of capsules transmitted at successive times, each capsule including a data producer identifier, a counter incremented at each data processing, a functional data packet comprising said thrust control vector, and a result of the data integrity check on the identifier, the counter and the functional data packet; each engine controller being configured to retrieve the identifier, the counter, the functional data packet, and the integrity check result of the received parallel capsules containing the control vectors generated in parallel, and to implement at least one identification check of the identifier, at least one validity check of the counter and at least one integrity check of said integrity check result of the received parallel capsules; each engine calculator being configured to select the thrust control vector of one of said received parallel capsules at least if the capsule identifier is correct, if the capsule is valid and if the capsule has integrity;
- during the identification check, the engine controller is configured to determine an identification status of the capsule, between a correct identification status and an incorrect identification status, depending on the retrieved identifier of the received capsule and an expected identifier for the received capsule;
- during the validity check, the engine controller is configured to determine a counter increment from the retrieved counter and from the counter of another capsule previously received by the engine controller, and to determine a validity status of the capsule between a valid status and an invalid status based on a consistency of the counter increment;
- during the integrity check, the engine controller is configured to determine a data integrity status of the capsule between an integrity status and a corrupted status by establishing a new integrity check result from the identifier, the counter and the functional data packet retrieved from the received capsule, and by comparing the new integrity check result to the integrity check result retrieved in the capsule;

each thrust control vector comprises a command for actuating the engine control elements and at least one additional item of information, the/each additional item of information preferably being an anemometric parameter;

the flight control unit has a manual thrust mode in which the/each thrust control vector is produced from signals received from the throttle and from the sensors of the sensor system, and an automatic thrust mode in which the/each thrust control vector is produced solely from signals received from the sensors of the sensor system, depending on a selected flight setpoint;

the flight control unit is configured to process the signals received from the throttle in order to apply overspeed and/or stall avoidance protection to the aircraft;

the thrust parameters controlled by the engine calculator include at least fuel flow, ignition, and fuel/air mixture ratio; and the throttle further comprises a engine configured to move the lever relative to the base body, with the flight control unit configured to control the throttle engine.

The present disclosure also relates to an aircraft comprising a piloting system as defined above.

Further, the present disclosure also relates to a method for piloting an aircraft comprising:

providing a piloting system as described above;

the flight control unit generating at least one thrust control vector from at least the said flight control law, having at least the signals received from the throttle and/or from the sensors of the sensor system as input data;

sending a digital signal comprising the generated thrust control vector to the engine calculator;

the engine calculator receiving the digital signal and controlling the engine thrust parameters according to the generated thrust control vector received.

BRIEF SUMMARY OF THE DRAWINGS

The present disclosure will be better understood upon reading the following description, given only as an example, and made with reference to the appended drawings, in which.

DETAILED DESCRIPTION

Figure 1:
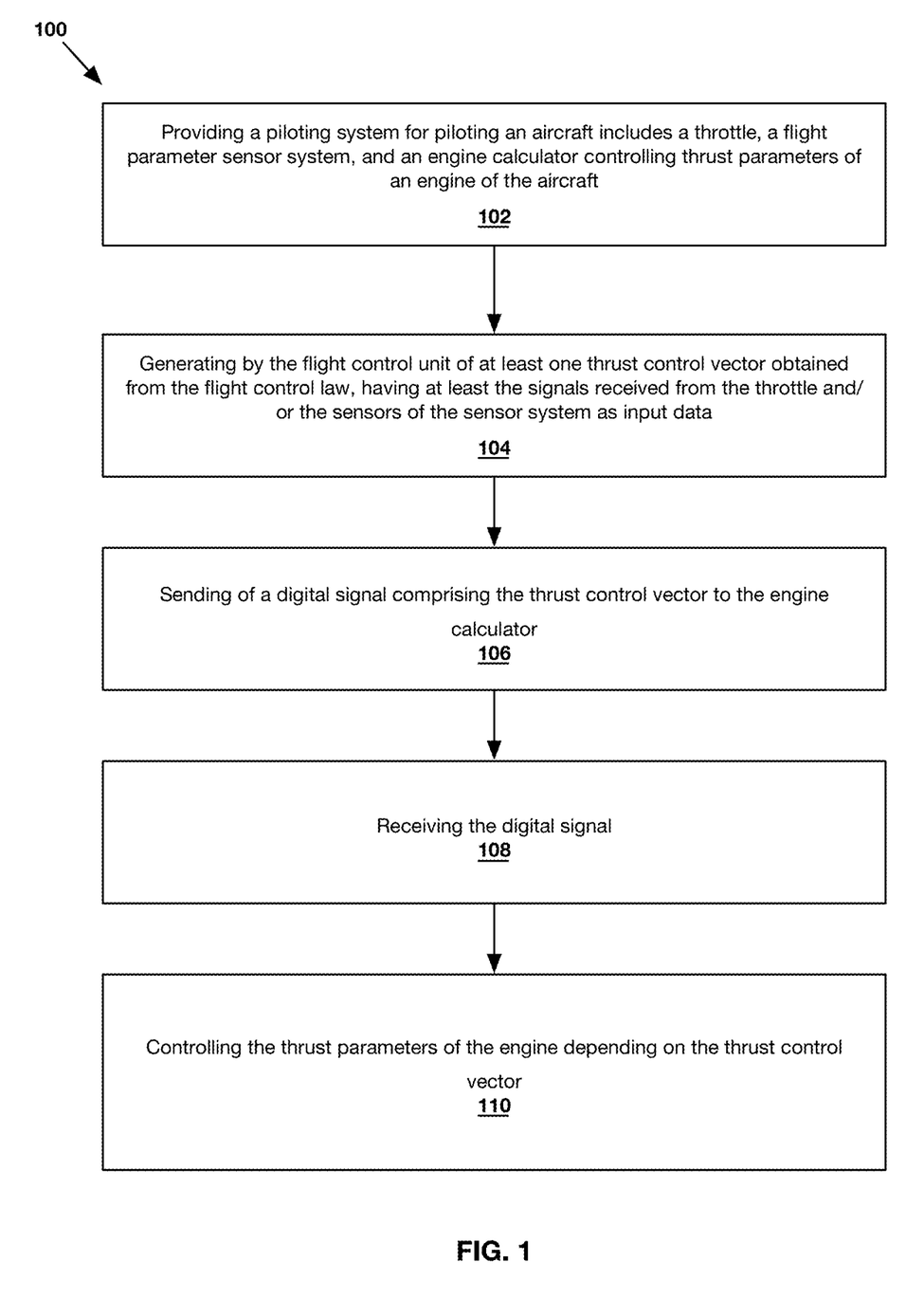
FIG. 1 is a block diagram, showing schematically an architecture of an example aircraft control system according to the present disclosure.

An example of a piloting system 10 according to the present disclosure, preferably comprised in an aircraft 12, is illustrated schematically in FIG. 1.

The aircraft 12 is a civil passenger transport aircraft, in particular a business aircraft, or a military aircraft, for example.

The aircraft 12 has control surfaces not shown, including pitch, roll, and rudder control surfaces, and airbrakes.

The aircraft 12 comprises at least one engine 14, such as a plurality of engines.

The piloting system 10 comprises at least one throttle 16, a sensor system 18, a flight control unit 20, and an engine calculator 22.

The piloting system 10 preferably also comprises a man/machine interface 24 capable of allowing a crew member to manually set at least one flight command to be imposed on the aircraft 12.

The throttle 16 is operable by a pilot of the aircraft 12, and includes at least one lever 26 and a base body 28.

The lever 26 is movable relative to the base body 28.

Preferably, the lever 26 is angularly movable relative to the base body 28. In a variant, the lever 26 is movable in translation relative to the base body 28.

The lever 26 is capable of being grasped by the pilot of the aircraft 12, to be moved relative to the base body 28. By such a movement of the lever 26, which corresponds to the actuation of the throttle 16, the pilot aims to control the aircraft thrust.

Advantageously, the throttle 16 also comprises a motor 30 configured to move the lever 26 relative to the base body 28.

The throttle 16 is configured to emit at least one signal representative of the position, angular for example, of the lever 26 relative to the base body 28.

This signal is representative of the thrust that the pilot wishes to control.

For this, the throttle 16 comprises a sensor 32, configured to measure said position, angular, for example, of the lever 26 and to emit said representative signal. Such a sensor is for example a rotary variable differential transformer (RVDT) sensor.

Preferably, the acquisition of the lever position 26 relative to the base body 28 is redundant, with the throttle 16 configured to emit a plurality of signals representative of the same current lever position 26 relative to the base body 28.

Said representative signal is an analog signal, for example. In a variant, said representative signal is a digital signal, for example.

An analog signal is defined here and hereafter as being formed by an electric current and/or an electric voltage varying within fixed limits. In particular, the analog signal has a continuous variation, i.e. no predefined steps or levels.

The analog signal is thus opposed to a digital signal, which uses quantization and coding of the information.

In particular, a digital signal circulates information represented by a finite number of determined discrete values, these discrete values being taken by at least one characteristic of the digital signal over time.

The sensor system 18 is a system of sensors for aircraft flight parameters.

Each sensor in the system 18 is capable of measuring a flight parameter of the aircraft 12 and to emit a signal representative of a current value of said flight parameter. The representative signal emitted by each sensor is analog or digital.

For example, the sensor system 18 comprises at least one inertial sensor 34A.

Each inertial sensor 34A is possibly a hybrid inertial unit, for example, with a satellite positioning system, in particular GPS.

Each inertial sensor 34A is capable of measuring current values of attitude, heading, course, velocity vector, ground speed, acceleration of the aircraft 12, which form flight parameters of the aircraft 12.

The sensor system 18 also includes at least one air data sensor 34B, for example.

Each air data sensor 34B is suitable for making speed and altitude measurements based on static or dynamic pressure measurements. It comprises Pitot probes, for example.

Each air data sensor 34B is capable of measuring current values of air speed, Mach, badin, altitude, and total and static temperatures of the aircraft 12, which form flight parameters of the aircraft 12.

The sensor system 18 further includes at least one attitude and heading reference sensor 34C, for example.

Each reference attitude and heading sensor 34C is at least one gyro meter, at least one accelerometer, for example, and/or at least one magnetometer that detect accelerations and magnetic fields experienced by the aircraft 12. Each attitude and heading reference sensor 34C is formed of micro-electro-mechanical systems (MEMS), for example.

Each reference attitude and heading sensor 34C is also capable of obtaining current values of attitude, heading, course, and acceleration of the aircraft 12, which form flight parameters of the aircraft 12.

The sensors of the sensor system 18 are connected to the flight control unit 20, to deliver, at each moment, the current values of flight parameters they measure to the flight control unit 20, at a frequency greater than or equal to 50 Hz, for example.

The flight control unit 20 is connected to the engine calculator 22, to the sensors of the sensor system 18 and to the throttle 16.

As shown in FIG. 1, the flight control unit 20 is interposed between the throttle 16 and the engine calculator 22. Thus, there is no longer a direct link between the throttle 16 and the engine calculator 22.

The flight control unit 20 is a digital flight command system (DFCS).

The flight control unit 20 is configured to receive at least the representative signal emitted by the throttle 16 and the signals emitted by the sensors of the sensor system 18.

At least one of said signals is analog, for example. In particular, at least the signal from the throttle 16 is analog, for example.

In general, the flight control unit 20 is configured to develop at least one thrust control vector obtained from at least one flight control law, having at least the signals received from the throttle 16 and/or the sensors of the sensor system 18 as input data. The flight control unit 20 is then configured to send a digital signal comprising the thrust control vector to the engine calculator 22.

In particular, each thrust control vector is transported and coded as binary bit strings.

The flight control unit 20 is preferably arranged away from the/each engine 14 of the aircraft 12 so as not to be subject to a temperature rise and/or vibration from the/each engine 14.

Preferably, as illustrated in the example in FIG. 1, the flight control unit 20 comprises at least four redundant flight control computer 38.

Each flight control computer 38 includes a processor and a memory, for example, containing software modules or applications suitable for execution by the processor to perform the functions of the flight control computer 38 described below. In a variant, each flight control computer 38 is implemented as programmable logic components or dedicated integrated circuits, intended to perform the functions of the flight control computer 38 described below.

The flight control computers 38 are arranged apart from the/each engine 14 as described above, for example.

Each flight control computer 38 is connected to the throttle 16 and the sensor system 18. In particular, each flight control computer 38 is configured to receive at least the representative signal emitted by the throttle 16 and the signals emitted by the sensors of the sensor system 18.

Each flight control computer 38 is configured to develop, in parallel, a thrust control vector from at least said flight control law, which has at least said signals from the throttle 16 and/or sensor system 18 received by the flight control computer 38 as input data.

For this, each flight control computer 38 is capable of implementing an analog/digital conversion of each analog signal received from the throttle 16 and/or the sensors of the sensor system 18.

The control law input data are in particular data representative of the current flight parameters values the measured by the sensors of the system 18 and, if necessary, the current position, for example angular, of the lever 26 of the throttle 16 operated by the pilot.

The control law, preferably a plurality of control laws, is (are) predefined for the aircraft 12, depending on an equipment operating level of the aircraft 12 for example. Each control law is stored in the memory of each flight control computer 38, for example.

Here and hereinafter, "control vectors generated in parallel" means the respective control vectors that have been generated by the flight control computers 38 from the same input data values in the control law.

They are generated for the same current flight parameter values measured by the sensors of the system 18 and, if necessary, for the same lever position 26 relative to the base body 28 of the throttle 16 operated by the pilot.

The control vectors generated in parallel by the flight control computers 38 are identical, except for an elaboration error on the part of at least one of the calculators, and neglecting possible asynchronisms.

Each generated control vector comprises an actuation instruction for the control elements 42, 44 of the engine 14, intended to be applied by the engine calculator 22.

This actuation instruction contains information enabling the engine calculator 22 to know which control element(s) 42, 44 to actuate and to what extent.

Preferably, each control vector further comprises at least one item of additional information, obtained from at least one of the sensors of the system 18, for example. Each item of additional information is preferably an anemometric parameter.

Thereafter, each flight control computer 38 is configured to send a digital signal including the generated thrust control vector to the engine calculator 22.

Specifically, thrust control vectors are generated in succession, by each control computer 38, and are sent in the digital signal output by each flight control computer 38.

In particular, each flight control computer 38 is capable of generating a thrust control vector, as described above, at an elaboration frequency greater than or equal to 20 Hz, for example. Each flight control computer 38 is capable of sending the generated thrust control vector at a transfer frequency greater than or equal to 20 Hz, for example.

Advantageously, the flight control unit 20 is configured to control the motor 30 of the throttle 16, depending on a predetermined control rule.

In one embodiment, the motor 30 is controlled depending on the control rule to move the lever 26 relative to the base body 28.

The control rule is stored in at least one of the memories.

Preferably, the control rule is based on each generated thrust vector. The motor 30 is then preferably controlled depending on the control rule to move the lever 26, a movement representative of the thrust ordered.

For this, the control rule includes a mapping table, for example, linking a generated thrust control vector to an angle or distance of the lever 26 relative to the base body 28.

Preferably, the movement ordered corresponds in particular to what the throttle lever 26 would have had if the pilot had ordered thrust corresponding to the generated control vector. The motorized movement of the throttle 16 lever 26 thus advantageously reflects the command generated by the flight control unit 20.

In a variant, the motorized movement of the throttle 16 lever 26 does not reflect the control generated by the flight control unit 20, but is chosen differently so as to ensure consistency between aircraft engine control and control over the movement of the throttle 16 lever 26. For example, the control rule is independent of each generated thrust control vector.

In a preferred embodiment, each flight control computer 38 is configured to generate a capsule including the generated control vector.

The control vectors successively generated by a single control computer 38 are then sent as a plurality of respective successive capsules.

Thus, each digital signal transmitted by the flight control computers 38 includes a plurality of capsules transmitted at successive moments.

Each capsule then advantageously comprises a data producer identifier, a counter incremented at each data processing, a functional data packet comprising said thrust control vector, and a data integrity check result relating to the identifier, the counter and the functional data packet.

The identifier is a bit string, for example, making it possible to identify the flight control computer 38 that generated the thrust control vector of the capsule and that generated the capsule.

The identifier is thus characteristic of each flight control computer 38 that issued the capsule. More specifically, each flight control computer 38 is associated with a distinct producer identifier.

The counter is a bit string encoding an order number of the functional data packet elaboration each time the functional data packet is generated. For example, the counter is incremented as a unit each time the functional data packet is generated. The counter is preferably incremented independently of the transfer frequency.

The counter makes it possible to associate a data refresh measurement to each transmitted capsule, which makes it possible to ensure that the functional data packet retrieved by the engine calculator 22 has indeed been refreshed by each flight control computer 38 and is therefore valid.

In particular, incrementing the counter each time functional data is processed by each flight control computer 38 ensures that a data refresh has occurred, and not that a simple new transmission of data without refresh has occurred.

The counter is capable of being reset to zero when a predefined counter maximum has been reached.

The functional data packet comprises only a single generated thrust control vector, for example.

In particular, one capsule is generated for each respective thrust control vector.

The integrity check result is a bit string encoding a check number calculated by mathematical processing, from a functional representation incorporating the capsule identifier, the capsule counter, and the capsule functional data packet.

The integrity check result is intended to detect corruption of the capsule. In particular, such capsule corruption may occur in the event of a memory problem within the flight control computer 38 and/or in the event of an electromagnetic disturbance due to the environment of the calculator 38 or the link with the engine calculator 22.

Preferably, the integrity check result is the result of a checksum, or cyclic redundancy code (CRC). For example, to ensure good reliability of the integrity check, the integrity calculation result is obtained by a MIL-STD-1760 checksum, or by a CRC-32K/6.4 cyclic redundancy code.

The mathematical processing is an algorithm, for example, chosen depending on the security objectives to be achieved, a minimum/maximum data packet length, the identifier, the counter, and a reliability of the data link, in terms of the bit error rate (BER). Examples of the algorithms used are described in the United States Federal Aviation Administration document DOT/FA/TC-14/49, March 5015, available at https://www.faa.gov/aircraft/air cert/design approvals/air software/media/TC-14-49.pdf.

The engine calculator 22 is connected to the engine equipment 14. The engine equipment 14 includes sensors 40 suitable for monitoring the condition of the engine 14, and also includes control elements 42, 44 such as hydraulic and electrical valves 42 and actuators 44, for example.

The engine calculator 22 is a digital control system of the engine equipment 14, preferably of the full authority digital engine control (FADEC) type.

The engine calculator 22 is then preferably configured to have full authority over the control of the engine 14, so that each control member 42, 44 of the engine 14 is then controlled solely by signals issued by the engine calculator 22, for example.

The engine calculator 22 is close to the engine 14. In particular, "close" means that the engine calculator 22 is susceptible to temperature rise and/or vibration from the engine 14.

The engine calculator 22 is preferably in contact with the ambient air and is cooled by a cooling system, for example, by taking in an air flow.

Generally, the engine calculator 22 is configured to receive each digital signal sent by the flight control unit 20 and to control thrust parameters of the engine 14, depending on at least one thrust control vector included in the digital signal, by operating control members 42, 44 of the engine 14.

The thrust parameters controlled by the engine calculator 22 comprise at least a fuel flow rate, an ignition, and a fuel/air mixture ratio, for example.

Specifically, as illustrated in FIG. 1, the engine calculator 22 comprises at least two redundant engine controllers 46 (or "electronic engine controllers").

Each engine controller 46 includes a processor and a memory, for example, containing software modules or applications suitable for execution by the processor to perform the functions of the engine controller 46 described below. In a variant, each engine controller 46 is implemented as programmable logic components or dedicated integrated circuits for performing the functions of the engine controller 46 described below.

In the example shown in FIG. 1, a first engine controller 46 is connected directly to only a portion, in this case two, of the flight control control computers 38. Here, the first of the engine controllers 46 is connected by at least one digital data transfer link 48 to two of the flight control computers 38.

For example, the first engine controller 46 is connected to said two flight control computers 38 by two different digital data transfer links 48.

The second engine controller 46 is only directly connected to the other of the flight control computers 38, in this case to the other two. In this example, the second engine controllers 46 is connected by at least one other digital data transfer link 48 to the other two flight control computers 38.

For example, the second engine controller 46 is connected to said other two flight control computers 38 by two different digital data transfer links 48.

As illustrated in FIG. 1, for each flight control computer 38, one digital data transfer link 48 connects said flight control computer 38 to only one of the engine controllers 46. In other words, the digital data transfer links 48 then each have an input connected to one of the flight control computers 38, an output connected to one of the engine controllers 46, and a link connecting the input to the output.

Each engine controller 46 is capable of receiving each control vector, in particular each capsule, sent by the flight control computers 38 to which it is connected, at a reception frequency greater than or equal to 20 Hz, for example.

The two engine controllers 46 are also connected to each other. As illustrated in FIG. 1, they are connected internally in particular to the engine calculator 22, for example.

They are further configured to communicate the respective control vectors received to each other, with this communication being within the engine calculator 22, for example. In the case where the control vectors are encapsulated, the engine controllers 46 are configured to communicate the respective capsules received to each other.

Each engine controller 46 thus directly receives the redundant thrust control vectors generated in parallel by each of the flight control computers 38, from the flight control unit 20 or indirectly through the other engine controller 46.

In particular, this architecture improves the transmission security.

Each engine controller 46 is configured to make a selection, at each moment, from among the control vectors generated in parallel by each flight control computer 38, and to control said thrust parameters of the engine 14 depending on the control vector selected.

In particular, the control members 42, 44 of the engine 14 are actuated by the engine calculator 22 depending on the control vector selected, in particular depending on the actuation command contained in the selected control vector. The engine calculator 22 emits corresponding signals to the control members 42, 44.

In the embodiment where the thrust control vectors are encapsulated, the selection made by each engine controller 46 will now be described in more detail.

To make this selection, each engine controller 46 is configured to retrieve the identifier, counter, functional data packet, and integrity check result of the received capsules containing the control vectors generated in parallel. These capsules are referred to as "received parallel capsules" hereafter.

Each engine controller 46 is then configured to implement at least one identifier check, at least one counter validity check, and at least one integrity check of said check result for each of the received parallel capsules.

Each engine controller 46 is configured to select the thrust control vector of one of said received parallel capsules at least if the capsule identifier is correct, if the capsule is valid and if the capsule has integrity.

Preferably, this selection is performed as soon as the capsule identifier is correct, the capsule is valid, and the capsule has integrity, for one of said received parallel capsules.

In particular, the checks are performed by each engine controller 46 in parallel, and as soon as a control vector is selected by one of the engine controllers 46, the engine calculator 22 applies the actuation instruction for said selected vector.

If the capsule identifier is incorrect, and/or if the capsule is invalid, and/or if the capsule is corrupted, the engine controller 46 is capable of excluding data from the capsule. In particular, a thrust control vector contained in such a capsule will not be selected and will not be applied by the engine controller 46.

These checks ensure the robustness of the order issued by the flight control computers 38.

During the identification check, the engine controller 46 is capable of verifying, whether the data received really comes from the expected flight control computer 38, based on the identifier.

Thus, the engine controller 46 is configured to determine an identification status of the capsule, between a correct identification status and an incorrect identification status.

This identification status is determined based on the retrieved identifier of the capsule received and an expected identifier for the capsule received from predefined semantics or/and a lookup table, for example.

During the validity check, the engine controller 46 is preferably configured to determine a validity capsule status, between a valid and an invalid status, by verifying their refresh using the counter retrieved.

To this end, the engine controller 46 is configured to determine a counter increment from the counter retrieved and from the counter of another capsule previously received by the engine controller 46.

The engine controller 46 is configured to determine the validity status of the capsule based on counter increment consistency.

It is capable of comparing the counter retrieved to the counter received from a previous capsule, to verify that the counter has incremented.

The engine controller 46 is capable of calculating the increment between the extracted counter of the capsule received and the counter of the capsule received just before, for example.

If the increment is consistent, the engine controller 46 is capable of determining that the functional data present in the capsule is indeed refreshed data and to place the capsule in the valid status.

The increment is considered as coherent by the engine controller 46 at least if it is unitary.

Advantageously, the calculator is configured to determine an increment consistency, calculated depending on the capsule production frequency by the flight control computer 38, the capsule transfer frequency by the flight control computer 38, and/or the capsule reception frequency by the engine controller 46.

In particular, in the case of a data transfer or reception frequency higher than the frequency of development of the functional data by the flight control computer 38, the engine controller 46 is capable of considering a zero counter increment over a determined capsule number as coherent, with such a number being calculated depending on the frequencies of elaboration, transfer or acquisition of the capsules, for example.

Beyond the determined number of capsules, if the counter remains identical, it is able to pass the capsule into the invalid status because its data has not been refreshed.

Moreover, when the capsule production and/or transfer frequency is higher than the capsule reception frequency, the engine controller 46 capable of considering a counter increment higher than one as coherent.

In all cases, the engine controller 46 is capable of memorizing the counter of each capsule that has just been received, to make an incremental calculation possible when the next capsule is received.

It is also capable of considering a counter increment resulting from setting the extracted counter to zero as consistent, when the latter has previously reached its maximum value.

Thus, depending on the increment calculated between the counters of two successive capsules, the engine controller 46 is capable of determining that the functional data present in the capsule is indeed refreshed data that can be used by the engine controller 46 and placing the capsule into the valid status, or, if on the contrary the data is not refreshed or if unreceived intermediate data is missing, placing the capsule into the invalid status.

During the integrity check, the engine controller 46 is preferably configured to determine a capsule data integrity status as either one of integrity or corrupted.

To do so, the engine controller 46 is configured to establish a new integrity check result from the identifier, counter, and functional data packet retrieved from the received capsule, and to compare the new integrity check result to the integrity check result retrieved from the capsule.

In particular, the engine controller 46 is capable of applying the same mathematical processing, to establish the new integrity check result, as that implemented by the flight control computer 38.

The engine controller 46 is capable of determining that the capsule comprising the identifier, counter and data packet has an integrity status if the new integrity check result calculated from the data received is identical to the integrity check result extracted from the capsule.

The engine controller 46 is capable of determining that the capsule is in a corrupted status if the new integrity check result calculated from the data received is different from the integrity check result extracted from the capsule.

Following the checks described above, when the capsule is in the correct identification status, in the integrity status and in the valid status, the functional data it contains is then suitable for use by the engine controller 46.

When a capsule has the incorrect identification status, the corrupted and/or invalid status, then the engine controller 46 is capable of excluding the data coming from the capsule.

The engine controller 46 is then also preferably capable of implementing a reset phase, for a given reset time corresponding to resetting one of the computers, for example, or stopping a transient failure.

Preferably, if the identification, integrity or refresh failure affecting the data contained in the capsules occurs regularly or in an arbitrary manner, the engine controller 46 is capable of stopping the rearming definitively and declaring the flight control computer 38 issuing the capsules to be in default.

The engine controller 46 is then configured to no longer take into account the digital signal sent by said flight control computer 38.

Figure 2:
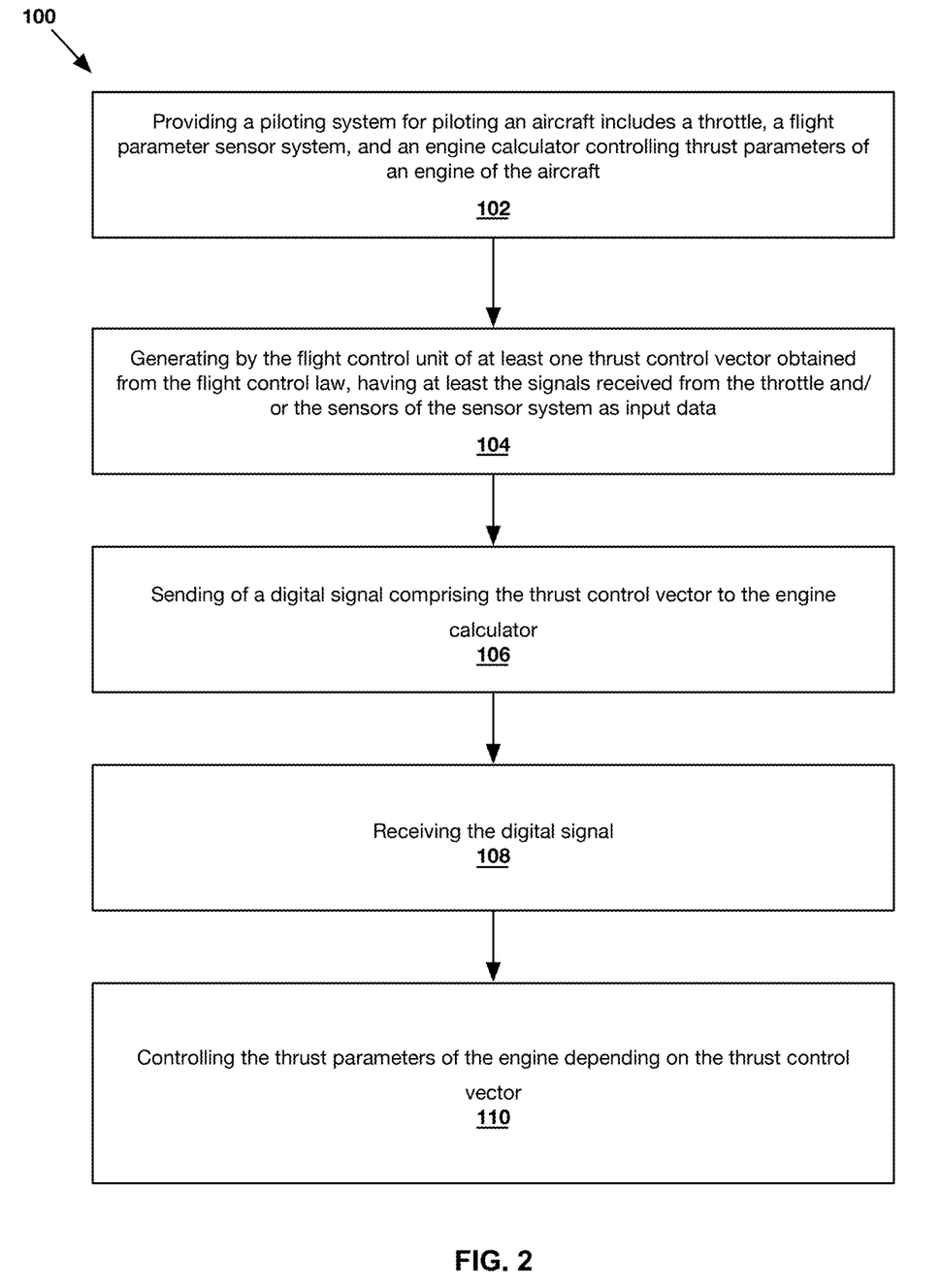
FIG. 2 is a flow chart of an example of a piloting method according to the present disclosure.

A method 100 for flying the aircraft using the above-described piloting system 10 will now be described, with reference to FIG. 2.

The method 100 comprises providing 102 said piloting system 10.

The method 100 comprises the generation 104 by the flight control unit 20 of at least one thrust control vector obtained from the flight control law, having at least the signals received from the throttle 16 and/or the sensors of the sensor system 18 as input data.

The method 100 subsequently comprises the sending 106 of a digital signal comprising the thrust control vector to the engine calculator 22.

These generating 104 and sending 106 steps are implemented by the flight control unit 20, preferably in the manner described above in more detail for the piloting system 10.

The method 100 then comprises the engine calculator 22 receiving 108 the digital signal and controlling 110 the thrust parameters of the engine 14 depending on the thrust control vector.

These reception 108 and control 110 steps are implemented by the engine calculator 22, preferably in the manner described above in more detail for the control system 10.

Variants of the control system 10 will now be described.

In a variant, the selection by each engine controller 46 is not solely made as soon as the capsule identifier is correct, the capsule is valid, and the capsule has integrity, for one of the capsules. In a variant, the selection is made by a centralized vote taken on the parallel capsules received. The centralized vote is then taken by determination algorithms, by majority or weighted average or median, for example.

In a variant, the control vectors are not encapsulated in the digital signal. Each engine controller 46 is then configured to select one of the received parallel vectors by a centralized vote on the received parallel vectors, for example. The centralized vote is then taken by determination algorithms, by majority or weighted average or median, for example.

In a variant, each generated control vector does not comprise an airspeed parameter. Each flight control computer 38 is then configured to send current airspeed parameter values in clean capsules included in the digital signal, for example. These capsules containing airspeed parameters are transmitted at a different frequency than those containing the thrust control vectors, for example.

In a preferred embodiment of the example described above, the flight control unit 20, and in particular each flight control computer 38, is also configured to process signals received from the throttle 16 and/or the sensor system 18 to apply overspeed and/or stall avoidance protection to the aircraft.

To do so, the flight control unit 20, and in particular each flight control computer 38, is capable of determining automatic protections, at least to prevent overspeed and/or stall. As input data, each flight control law then has at least said throttle 16 and/or sensor system 18 signals received, and the protections determined.

Thus, the flight control unit 20 modulates the commands entered by the pilot when he operates the throttle 16.

In another advantageous embodiment, the flight control unit 20 has an automatic thrust mode, and a manual thrust mode.

In manual thrust mode, each thrust control vector is generated from the signals received from the throttle 16 and the sensors of the sensor system 18. Each flight control computer 38 then takes into account an actuation of the throttle 16 by the pilot in particular in generating the thrust control vectors.

In automatic thrust mode, the/each thrust control vector is generated solely from signals received from the sensors of the sensor system 18 depending on at least one selected flight setpoint, such as depending on a plurality of flight setpoints. Thus, an actuation of the throttle 16 by the pilot is not taken into account in generating the thrust control vectors.

Each flight set point is manually defined by a crew member through the man/machine interface 24, for example. Each flight instruction is a heading and/or a route and/or an airspeed and/or a Mach, and/or an altitude, and/or a climb or descent gradient, and/or a climb instruction as large as possible without decelerating, or a descent instruction as small as possible without accelerating, for example.

Thus, in this embodiment, the self-maneuvering algorithms of the prior art are replaced by automatic thrust control by the flight control unit 20.

In a variant, the aircraft 12 is a drone, for example. The aircraft 12 then has no throttle.

The different embodiments and variants described above are combined according to any technically possible combination.

Thanks to the features described above, the control system 10 is robust to the analog acquisition noise of the throttle 16. In particular, the distance between the throttle 16 and the engine 14 no longer has an impact on the thrust control noise.

The engine calculator 22 no longer requires a dedicated analog signal acquisition stage to receive the thrust command. The reliability of the system is therefore improved insofar as a digital link is less dependent on the thermal environment and vibrations generated by the engine 14 than an analog link.

Moreover, it is then possible to condense the electronics.

The flight control unit 20 also makes it possible to circulate additional information to the command for actuating the control elements 42, 44 of the engine 14 (pilot commands, airspeed parameters), and thus to eliminate additional digital links in the aircraft. This results in a gain in weight and the consistency of the information used in the aircraft is improved.

Also, thanks to the present disclosure just described, it is possible to encapsulate functional data by securing it during each data processing, and not at the data transmission level.

Functional data encapsulated in this way is therefore highly secure, and this prevents the loss or erroneousness of such data from producing critical consequences on the aircraft 12.

Further, in the described piloting system 10, loss of motorization of the throttle 16 no longer leads to loss of the automatic thrust control function. More generally, the total loss of the joystick function no longer implies an inability to pilot the engine.

The thrust control quality is greatly improved, since it does not only involve the throttle 16.

Finally, the present disclosure unexpectedly covers the certification requirements of three different areas, namely those relating to thrust automation, thrust control calculation and throttle 16 processing.

What is claimed is:

1. A piloting system of an aircraft comprising:
   a throttle operable by a pilot of the aircraft, the throttle including at least one lever and a base body, the lever being movable relative to the base body, the throttle being configured to emit a signal representative of the lever position relative to the base body;
   a sensor system for flight parameters of the aircraft;
   an engine calculator configured for controlling thrust parameters of at least one engine of the aircraft by actuating control members of the engine; and
   a flight control unit connected to the engine calculator, the sensors of the sensor system and the throttle,
   the flight control unit being configured to generate at least one thrust control vector from at least one flight control law, the flight control law having at least the signals received from the throttle and/or from the sensors of the sensor system as input data;
   the flight control unit being configured to send a digital signal comprising the generated thrust control vector to the engine calculator, and
   the engine calculator being configured to receive the digital signal and to control said thrust parameters of the engine depending on the generated thrust control vector received
   wherein the flight control unit comprises at least four redundant flight control computers, each flight control computer being connected to the throttle and to the sensor system, being configured to develop a thrust control vector, in parallel, from at least said flight control law, and being configured to send a digital signal including the thrust control vector to the engine calculator;
   wherein the engine calculator comprises at least two redundant engine controllers connected to each other, each engine controllers being configured to make a selection from among the control vectors generated in parallel by each flight control computer, and to control said thrust parameters of the engine depending on the selected control vector;
   wherein the piloting system further comprises, for each flight control computer, a digital data transfer link connecting said flight control computer to only one of the engine controllers, a first one of the engine controllers being connected by at least one of the digital data transfer links to two of the flight control computers and a second one of the engine controllers being connected by at least one other of the digital data transfer links to the other two of the flight control computers; the engine controllers being configured to communicate the respective received control vectors to each other.

2. The piloting system according to claim 1, wherein each digital signal includes a plurality of capsules transmitted at successive times, each capsule comprising a data producer identifier, a counter incremented at each data processing, a functional data packet comprising said thrust control vector, and a data integrity check result relating to the identifier, the counter and the functional data packet;
   each engine controller being configured to retrieve the identifier, the counter, the functional data packet, and the integrity check result of received parallel capsules containing the control vectors generated in parallel, and to implement at least one identification check of the identifier, at least one validity check of the counter and at least one integrity check of said integrity check result of the received parallel capsules;
   each engine controller being configured to select the thrust control vector of one of said received parallel capsules, at least if the capsule identifier is correct, if the capsule is valid and if the capsule has integrity.

3. The piloting system according to claim 2, wherein, during the identification check, the engine controller is configured to determine a capsule identification status, from a correct identification status or an incorrect identification status, based on the retrieved identifier of the capsule received and an expected identifier for the capsule received.

4. The piloting system according to claim 2, wherein, during the validity check, the engine controller is configured to determine a counter increment from the retrieved counter and from the counter of another capsule previously received by the engine controller, and to determine a validity status of the capsule between a valid status and an invalid status based on a consistency of the counter increment.

5. The piloting system according to claim 2, wherein, during the integrity check, the engine controller is configured to determine a data integrity status of the capsule, from an integrity status or a corrupted status, by establishing a new integrity check result from the identifier, the counter, and the functional data packet retrieved from the capsule received, and comparing the new integrity check result to the integrity check result retrieved from the capsule.

6. The piloting system according to claim 1, wherein each thrust control vector comprises a command for actuating the control members of the engine and at least one additional item of information.

7. The piloting system according to claim 6, wherein the or each additional item of information is an anemometric parameter.

8. The piloting system according to claim 1, wherein the flight control unit has a manual thrust mode in which the or each thrust control vector is generated from signals received from the throttle and the sensors of the sensor system, and an automatic thrust mode in which the or each thrust control vector is generated solely from signals received from the sensors of the sensor system, depending on a selected flight setpoint.

9. The piloting system according to claim 1, wherein the flight control unit is configured to process signals received from the throttle to apply overspeed and/or stall avoidance protection to the aircraft.

10. The piloting system according to claim 1, wherein the thrust parameters controlled by the engine calculator include at least fuel flow rate, ignition, and fuel/air mixture ratio.

11. The piloting system according to claim 1, wherein the throttle further comprises a motor configured to move the lever relative to the base body, the flight control unit being configured to control the motor of the throttle.

12. An aircraft comprising the piloting system according to claim 1.

13. A method for piloting an aircraft comprising:
providing the piloting system according to claim 1;
generating, by the flight control unit, at least one thrust control vector from at least said flight control law having at least the signals received from the throttle and/or from the sensors of the sensor system as input data;
sending a digital signal comprising the generated thrust control vector to the engine calculator; and
receiving, by the engine calculator, the digital signal and controlling the thrust parameters of the engine, depending on the received generated thrust control vector.

14. A piloting system of an aircraft comprising:
a throttle operable by a pilot of the aircraft, the throttle including at least one lever and a base body, the lever being movable relative to the base body, the throttle being configured to emit a signal representative of the lever position relative to the base body;
a sensor system for flight parameters of the aircraft;
an engine calculator configured for controlling thrust parameters of at least one engine of the aircraft by actuating control members of the engine; and
a flight control unit connected to the engine calculator, the sensors of the sensor system and the throttle,
the flight control unit being configured to generate at least one thrust control vector from at least one flight control law, the flight control law having at least the signals received from the throttle and/or from the sensors of the sensor system as input data;
the flight control unit being configured to send a digital signal comprising the generated thrust control vector to the engine calculator, and
the engine calculator being configured to receive the digital signal and to control said thrust parameters of the engine depending on the generated thrust control vector received;
wherein the flight control unit comprises at least four redundant flight control computers, each flight control computer being connected to the throttle and to the sensor system, being configured to develop a thrust control vector, in parallel, from at least said flight control law, and being configured to send a digital signal including the thrust control vector to the engine calculator;
wherein the engine calculator comprises at least two redundant engine controllers connected to each other, each engine controllers being configured to make a selection from among the control vectors generated in parallel by each flight control computer, and to control said thrust parameters of the engine depending on the selected control vector;
wherein each digital signal includes a plurality of capsules transmitted at successive times, each capsule comprising a data producer identifier, a counter incremented at each data processing, a functional data packet comprising said thrust control vector, and a data integrity check result relating to the identifier, the counter and the functional data packet;
each engine controller being configured to retrieve the identifier, the counter, the functional data packet, and the integrity check result of received parallel capsules containing the control vectors generated in parallel, and to implement at least one identification check of the identifier, at least one validity check of the counter and at least one integrity check of said integrity check result of the received parallel capsules;
each engine controller being configured to select the thrust control vector of one of said received parallel capsules, at least if the capsule identifier is correct, if the capsule is valid and if the capsule has integrity.

15. The piloting system according to claim 14, wherein, during the identification check, the engine controller is configured to determine a capsule identification status, from a correct identification status or an incorrect identification status, based on the retrieved identifier of the capsule received and an expected identifier for the capsule received.

16. The piloting system according to claim 14, wherein, during the validity check, the engine controller is configured to determine a counter increment from the retrieved counter and from the counter of another capsule previously received by the engine controller, and to determine a validity status of the capsule between a valid status and an invalid status based on a consistency of the counter increment.

17. The piloting system according to claim 14, wherein, during the integrity check, the engine controller is configured to determine a data integrity status of the capsule, from an integrity status or a corrupted status, by establishing a new integrity check result from the identifier, the counter, and the functional data packet retrieved from the capsule received, and comparing the new integrity check result to the integrity check result retrieved from the capsule.

* * * * *